(12) United States Patent
Tanji

(10) Patent No.: US 11,349,730 B2
(45) Date of Patent: May 31, 2022

(54) OPERATION DEVICE AND OPERATION METHOD

(71) Applicant: Nippon Telegraph and Telephone Corporation, Tokyo (JP)

(72) Inventor: Naoyuki Tanji, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 16 days.

(21) Appl. No.: 17/253,241

(22) PCT Filed: Jun. 12, 2019

(86) PCT No.: PCT/JP2019/023235
§ 371 (c)(1),
(2) Date: Dec. 17, 2020

(87) PCT Pub. No.: WO2019/244733
PCT Pub. Date: Dec. 26, 2019

(65) Prior Publication Data
US 2021/0266238 A1 Aug. 26, 2021

(30) Foreign Application Priority Data

Jun. 21, 2018 (JP) .............................. JP2018-117673

(51) Int. Cl.
*H04L 41/5054* (2022.01)
*H04L 41/0654* (2022.01)
*H04L 41/0853* (2022.01)

(52) U.S. Cl.
CPC ...... *H04L 41/5054* (2013.01); *H04L 41/0654* (2013.01); *H04L 41/0853* (2013.01)

(58) Field of Classification Search
CPC ............. H04L 41/5054; H04L 41/0654; H04L 41/0853

(Continued)

(56) References Cited

U.S. PATENT DOCUMENTS

2006/0168208 A1* 7/2006 Nagami .............. H04L 41/0893
                                                              709/224
2010/0217837 A1* 8/2010 Ansari .................. G06Q 30/04
                                                              709/218

(Continued)

FOREIGN PATENT DOCUMENTS

JP        2012-43121        3/2012
JP        2017-143452       8/2017

OTHER PUBLICATIONS

[No Author Listed], "Practice of Business System Operation Management by JP1, first edition," Tokyo: Gijutsu-Hyohron, Nov. 1, 2009, pp. 300-308, 24 pages (with English Translation).

*Primary Examiner* — Meng Vang
(74) *Attorney, Agent, or Firm* — Fish & Richardson P.C.

(57) ABSTRACT

[Subject] Development costs of operation automation are reduced.
[Solution] An operation apparatus (1) includes a message storage unit (31) configured to store messages to be exchanged between a plurality of types of operational components, the operational components obtained by converting an operational process executed as the operation into components, a firing rule storage unit (32) storing rules to be applied to each of the operational components, an action storage unit (33) storing actions indicating operation content of each of the operational components, a rule execution unit (22) configured to refer to the message storage unit (31) and the firing rule storage unit (32) and, when there is a firing rule, execute, for each of the operational components, a process of selecting the action corresponding to the firing rule from the action storage unit, an action execution unit (23) configured to execute the selected action for each of the operational components, and a transmission message processing unit (24) configured to execute, for each of the operational components, a process of creating a message (Continued)

addressed to the other operational components on the basis of an execution result of the executed action.

6 Claims, 9 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2014/0122709 A1* | 5/2014 | Golani | H04L 43/08 |
| | | | 709/224 |
| 2015/0381407 A1* | 12/2015 | Wang | H04L 41/0663 |
| | | | 370/221 |
| 2017/0091007 A1 | 3/2017 | Dasari | |
| 2019/0095265 A1* | 3/2019 | Dome | H04L 41/147 |
| 2019/0356568 A1* | 11/2019 | Dongre | H04L 43/065 |

* cited by examiner

COMMON TO ALL MESSAGES

| NO. | key | Value (EXAMPLE) | Metadata (EXAMPLE) |
|---|---|---|---|
| 1 | src | bc74a248-91d6-4b1b-a1a8 | |
| 2 | dst | all-parts | |
| 3 | src_type | tester | |
| 4 | dst_type | collector | |
| 5 | id | 0b9da9f4-c0d8-4585 | |
| 6 | relation_msg | { parent_msg : 455a7e03-524a-4423, sibling_msg : 4b4d076a-5671-471e } | |
| 7 | msg_type | request | |

INFORMATION FOR EACH OF MESSAGE TYPES

| NO. | key | Value (EXAMPLE) | Metadata (EXAMPLE) |
|---|---|---|---|
| 8 | expect_state | { target : http://db:9200/node1/eth0/in.traffic, interval : 60, period : 10, deadline: 1526050799 } | { target : { type : string }, interval : { type : int, unit : sec }, period : { type : int }, deadline : { type : int, unit : unix_time } } |
| 9 | current_state | | |
| 10 | response_code | { code : 202, state : accepted, URI : http://db:9200/node2/cpu/ } | |

Fig. 4

| NO. | OPERATIONAL COMPONENT | if | then |
|---|---|---|---|
| 1 | COMMON | RECEIVE NEW MESSAGE | STORE IN MESSAGE STORAGE UNIT |
| 2 | INFORMATION COLLECTION | PREDETERMINED PERIOD OF TIME HAS ELAPSED FROM PREVIOUS COLLECTION | EXECUTE PERIODIC COLLECTION TRANSMIT COLLECTION COMPLETION MESSAGE TO OTHER OPERATIONAL COMPONENTS AFTER SUCCESS |
| 3 | INFORMATION COLLECTION | RECEIVE INFORMATION COLLECTION REQUEST AND BE ABLE TO PROCESS INFORMATION REQUESTED | REPLY TO TRANSMISSION SOURCE WITH INFORMATION INDICATING REQUEST RECEIPT AND STORAGE DESTINATION COLLECT INFORMATION REQUIRED FOR REQUESTED PERIOD OF TIME AND STORE INFORMATION IN COMMON DATA STORAGE UNIT REPLY TO TRANSMISSION SOURCE WITH RELEVANT INFORMATION (SUCH AS PROCESSING SUCCESS) AFTER COLLECTION COMPLETION |
| 4 | INFORMATION ANALYSIS | RECEIVE COLLECTION COMPLETION MESSAGE OR MANIPULATION COMPLETION MESSAGE AND BE ABLE TO PROCESS INFORMATION TO BE ANALYZED | ACQUIRE AND ANALYZE INFORMATION FROM COMMON DATA STORAGE UNIT TRANSMIT ANALYSIS COMPLETION MESSAGE TO OTHER OPERATIONAL COMPONENTS AFTER ANALYSIS COMPLETION |
| 5 | INFORMATION ANALYSIS | RESULT OF ANALYSIS INDICATES CALCULATED VALUE EXCEEDS THRESHOLD VALUE | TRANSMIT ALARM MESSAGES TO OTHER OPERATIONAL COMPONENTS |
| 6 | INFORMATION MANIPULATION | RECEIVE COLLECTION COMPLETION MESSAGE AND BE ABLE TO PROCESS INFORMATION TO BE MANIPULATED | ACQUIRE INFORMATION FROM COMMON DATA STORAGE UNIT AND MANIPULATE INFORMATION NEWLY STORE IN COMMON DATA STORAGE UNIT AFTER MANIPULATION COMPLETION, TRANSMIT MANIPULATION COMPLETION MESSAGE TO OTHER OPERATIONAL COMPONENTS |
| 7 | TESTING | RECEIVE ALARM MESSAGE AND TEST CONDITION FOR ALARM TARGET IS SATISFIED (THERE IS PERMISSION OF TEST EXECUTION, OR LIKE) | EXECUTE TEST OF ALARM TARGET (SUCH AS A COMMUNICATION TEST AND LIFE AND DEATH TEST) TRANSMIT TEST RESULT MESSAGE TO OTHER OPERATIONAL COMPONENTS AFTER TEST COMPLETION |
| 8 | TESTING | RECEIVE ALARM MESSAGE AND TEST CONDITION FOR ALARM TARGET IS NOT SATISFIED (NO PERMISSION OF TEST EXECUTION) | TRANSMIT MESSAGE INDICATING REQUIREMENTS NECESSARY FOR TEST TO OTHER OPERATIONAL COMPONENTS WHEN TEST CONDITION IS SATISFIED IN RESPONSE, UPDATE STATE AND STORE STATE IN COMMON DATA STORAGE UNIT |
| 9 | TESTING | (RESULT OF TEST: NG) | TRANSMIT ALARM MESSAGE WITH INFORMATION ON NG LOCATION TO OTHER OPERATIONAL COMPONENTS |
| 10 | CONFIGURATION CHANGE | RECEIVE ALARM MESSAGE AND THERE IS CHANGING UNIT FOR NG LOCATION | EXECUTE CHANGING UNIT |
| 11 | CONFIGURATION CHANGE | THERE IS ping RESPONSE OF NETWORK DEVICE, BUT THERE IS NO RESPONSE OF APPLICATION AND THERE IS APPLICATION RESTARTING UNIT | EXECUTE RESTART OF APPLICATION |
| 12 | ADMINISTRATOR UI | RECEIVE MESSAGE | STORE RECEIVED MESSAGE AS LOG |
| 13 | ADMINISTRATOR UI | ACQUIRE PERMISSION OF TEST EXECUTION FROM ADMINISTRATOR | TRANSMIT TEST EXECUTION PERMISSION MESSAGE TO OTHER OPERATIONAL COMPONENTS |

Fig. 5

| NO. | OPERATIONAL COMPONENT | FUNCTION | ARGUMENTS NECESSARY FOR EXECUTION |
|---|---|---|---|
| 1 | COMMON | TRANSMIT MESSAGE | MESSAGE TYPE AND CONTENT<br>TRANSMISSION DESTINATION (EXAMPLE: a48as-astfj, ...)<br>TRANSMISSION DESTINATION TYPE (EXAMPLE: all-parts) |
| 2 | | RECEIVE MESSAGE | MESSAGE PATH ID |
| 3 | INFORMATION COLLECTION | COLLECT SERVER INFORMATION | IP ADDRESS OF TARGET DEVICE (EXAMPLE: ip-addr)<br>METRICS TO BE COLLECTED (EXAMPLE: cpu-user) |
| 4 | | COLLECT NW INFORMATION | IP ADDRESS OF TARGET DEVICE<br>METRICS TO BE COLLECTED (EXAMPLE: eth0_in_traf) |
| 5 | INFORMATION ANALYSIS | DETECT OUTLIER FOR TIME SERIES DATA | TIME SERIES DATA<br>PERIOD OF TIME TO BE ANALYZED |
| 6 | | TRANSMIT ALARM MESSAGE | TARGET METRICS<br>ALARM TARGET TIME |
| 7 | INFORMATION MANIPULATION | STATISTICAL PROCESSING (CALCULATION OF REPRESENTATIVE VALUES) | TIME SERIES DATA (EXAMPLE: Data []]<br>REPRESENTATIVE VALUE TO BE OUTPUT (EXAMPLE: ave, max, min) |
| 8 | | VISUALIZATION | TIME SERIES DATA<br>TARGET PERIOD OF TIME |
| 9 | TESTING | L3 LIFT AND DEATH MONITORING FOR DEVICE | IP ADDRESS OF TARGET DEVICE |
| 10 | | L4 PORT MONITORING | IP ADDRESS OF TARGET DEVICE<br>PORT OF TARGET (EXAMPLE: 8080)<br>PROTOCOL (EXAMPLE: tcp, udp) |
| 11 | CONFIGURATION CHANGE | SPECIFICATION CHANGE OF VM | ID OF TARGET VM (EXAMPLE: ak4o56-akm6)<br>CONTENT AFTER CHANGING (EXAMPLE: x1-large) |
| 12 | | APPLICATION RESTART | IP ADDRESS OF TARGET DEVICE<br>RESTART METHOD (EXAMPLE: service httpd restart) |

Fig. 6

OPERATION DEVICE AND OPERATION METHOD

CROSS-REFERENCE TO RELATED APPLICATIONS

This application is a National Stage application under 35 U.S.C. § 371 of International Application No. PCT/JP2019/023235, having an International Filing Date of Jun. 12, 2019, which claims priority to Japanese Application No. 2018-117673, filed on Jun. 21, 2018. The disclosure of the prior application is considered part of the disclosure of this application, and is incorporated in its entirety into this application.

TECHNICAL FIELD

The present invention relates to an operation apparatus and an operation method.

BACKGROUND ART

Regarding the maintenance of services provided on a network, operations such as fault handling of network devices or handling of reporting from users using services are performed. When an operation is performed manually according to the knowledge or judgment of an administrator, there may be disadvantages such as deterioration in the quality of service due to a long handling time, variations in the quality of service due to variations in administrator skill, and an increase in operation costs according to a greater amount of operations of the administrator.

Therefore, in recent years, development of an operation automation technology for assisting in automating the judgment of the administrator and reducing a need for the knowledge or judgment of the administrator to resolve the above disadvantages has been performed. In the operation automation technology, when judgment criteria and procedures of an operational process executed as an operation are well-defined, the knowledge or judgment of the administrator can be formulated. Thus, development of an operation automation system that implements operation automation by representing a series of procedures from a trigger (input) to a result (output) of an operational process through a definition of a workflow on a rule basis has been performed. The administrator views a result report determined and output by the operation automation system and need only perform a permission operation with respect to a specific operation, as necessary, and thus a maintenance burden is small.

Specific examples of the operation automation technology are well known. For example, a configuration management tool such as Ansible is known for a process in which a target process is construction such as installation of software or settings. Further, network management software such as Zabbix is known for a process in which a target process is monitoring of performance of hardware or monitoring of a process life and death state. Further, a continuous integration tool such as Jenkins or StackStorm is known for a process in which a target process is verification (continuing development) in software development or fault handing. Further, Patent Literature 1 is known for a process in which a target process is an order for service such as service construction or input of settings.

CITATION LIST

Patent Literature

Patent Literature 1: JP 2017-143452A

SUMMARY OF THE INVENTION

Technical Problem

In general, conditional branching according to knowledge or judgment of an administrator is very complex. An example of conditional branching includes conditional branching of a trial and error type operational process such as fault isolation. Thus, even in an operational process in which judgment criteria and the procedures are well-defined, a workflow defined to represent the operational process is large in scale and complex. Thus, there is a problem in that operation automation of the related art involves significant development costs.

Therefore, an object of the present invention is to reduce development costs of operation automation in light of the above circumstances.

Means for Solving the Problem

In order to solve the problem, an invention according to claim 1 is an operation apparatus for executing an operation regarding a service on a network, the operation apparatus including: a message storage unit configured to store messages to be exchanged between a plurality of types of operational components, the operational components obtained by converting an operational process executed as the operation into components; a firing rule storage unit storing rules to be applied to each of the operational components; an action storage unit storing actions indicating operation content of each of the operational components; a rule execution unit configured to refer to the message storage unit and the firing rule storage unit and when there is a firing rule executable according to the rule, execute, for each of the operational components, a process of selecting the action corresponding to the firing rule from the action storage unit; an action execution unit configured to execute the selected action for each of the operational components; and a transmission message processing unit configured to execute, for each of the operational components, a process of creating a message addressed to the other operational components on the basis of an execution result of the executed action.

An invention according to claim 4 is an operation method at an operation apparatus for executing an operation regarding a service on a network, wherein the operation apparatus includes a message storage unit configured to store messages to be exchanged between a plurality of types of operational components, the operational components obtained by converting an operational process executed as the operation into components; a firing rule storage unit storing rules to be applied to each of the operational components; and an action storage unit storing actions indicating operation content of each of the operational components, and the method includes, at the operation apparatus; referring to the message storage unit and when there is a firing rule executable according to the rule, the firing rule storage unit and executing, for each of the operational components, a process of selecting the action corresponding to the firing rule from the action storage unit; executing the selected action or each of the operational components; and executing, for each of the operational components, a process of creating a message addressed to the other operational components on the basis of an execution result of the executed action.

According to the invention described in claims 1 and 4, because the entire workflow can be established as a result of each of the operational components obtained by converting the operational process into components operating autonomously, it is unnecessary for an entire large scale and complex workflow itself to be defined.

Thus, it is possible to reduce development costs of operation automation.

An invention according to claim 2 is the operation apparatus according to claim 1, wherein the operation is an operation for implementing fault recovery in a network in which the service is provided, and the operational components include an information collection component configured to collect information from a network configuration providing the service; an information analysis component configured to analyze the collected information; an information manipulation component configured to manipulate the collected information; a test component configured to perform a test for fault confirmation in the network; and a configuration changing component configured to change the network configuration.

An invention according to claim 5 is the operation method according to claim 4, wherein the operation is an operation for implementing fault recovery in a network in which the service is provided, and the operational components include an information collection component configured to collect information from a network configuration providing the service; an information analysis component configured to analyze the collected information; an information manipulation component configured to manipulate the collected information; a test component configured to perform a test for fault confirmation in the network; and a configuration changing component configured to change the network configuration.

According to the invention described in claims 2 and 5, it is possible to reduce development costs of operation automation for implementing fault recovery.

An invention according to claim 3 is the operation apparatus according to claim 1 or 2, wherein the operational component includes an administrator UI (user interface) configured to transmit a message with which an administrator permits an operation of each of the operational components to each of the operational components.

An invention according to claim 6 is the operation method according to claim 4 or 5, wherein the operational component includes an administrator UI configured to transmit a message with which an administrator permits an operation of each of the operational components to each of the operational components.

According to the inventions according to claims 3 and 6, it is possible to provide a unit that causes judgement of the administrator to intervene in an automated operation, and to assist in quality assurance of services.

Effects of the Invention

According to the present invention, it is possible to reduce development costs of operation automation.

BRIEF DESCRIPTION OF DRAWINGS

FIG. 4 is an example of a data structure of a message in the specific example.

FIG. 5 is a diagram illustrating an example of a data structure of a firing rule storage unit in the specific example.

FIG. 6 is a diagram illustrating an example of a data structure of an action storage unit in the specific example.

DESCRIPTION OF EMBODIMENTS

A mode for implementing the present invention (embodiment) will be described below with reference to the drawings.

In the present embodiment, an operational process executed as a service maintenance operation is classified in units of functions, and the operational process is converted into components. The components of the operational process classified in units of functions are referred to as "operational components". Further, a workflow closed for each of the operational components (workflow component) is defined, and the operational components are operated according to individual rules, such that the operational components are made autonomous. The respective operational components are loosely coupled via a predetermined interface (IF) so that exchange of messages between the operational components is enabled. The embodiment proposes an autonomous control loop scheme for causing an entire workflow to be established as a result of autonomously operating each of the operational components. According to this scheme, because this scheme eliminates a need to define an entire large scale and complex workflow itself, it is possible to reduce development costs of operation automation.

Configuration

Figure 1:
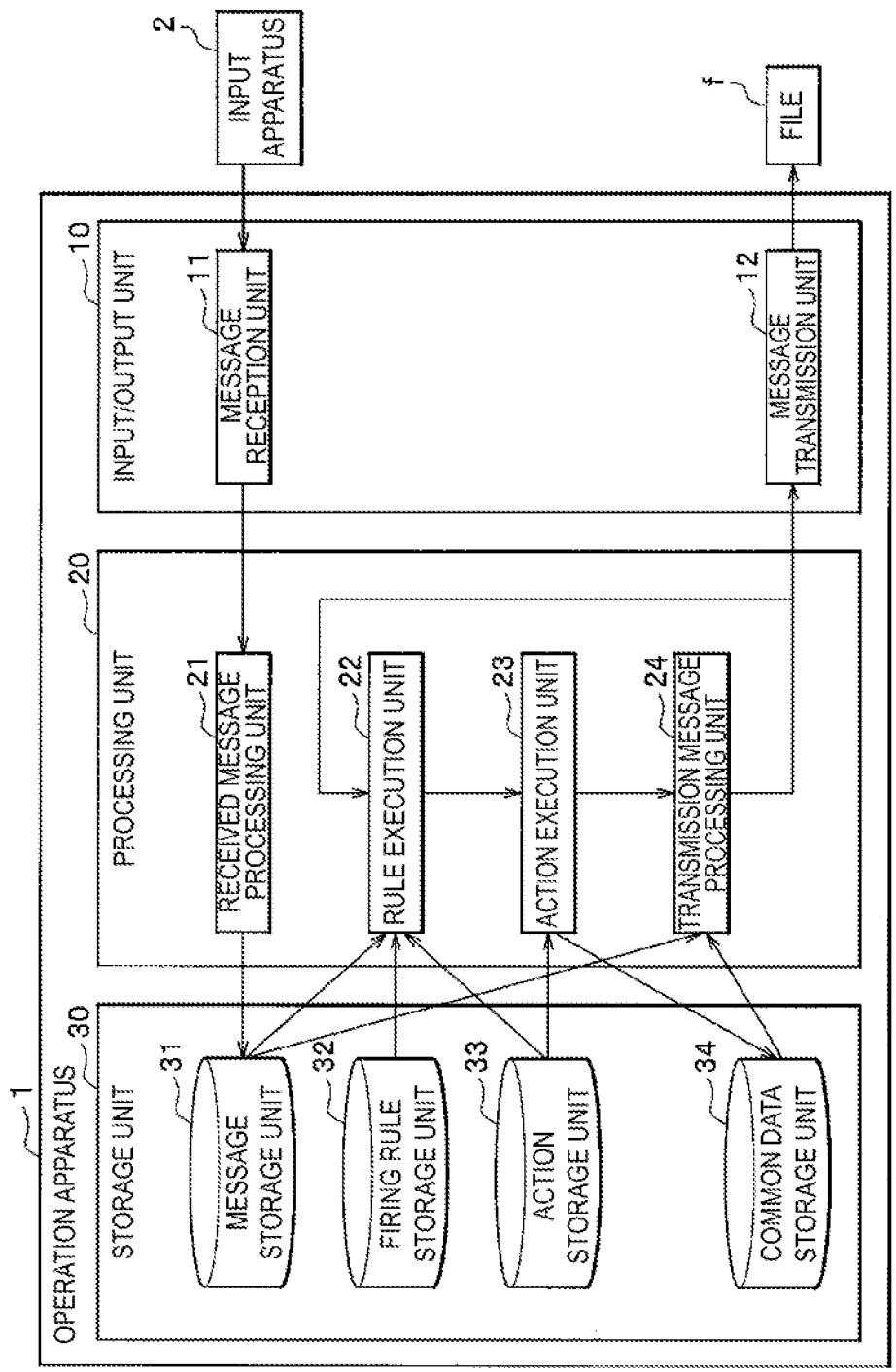
FIG. 1 is a functional configuration diagram of an operation apparatus according to the present embodiment.

A configuration of an operation apparatus according to the embodiment will first be described. As shown in FIG. 1, the operation apparatus 1 of the embodiment includes hardware such as an input/output unit 10, a processing unit 20, and a storage unit 30. A central processing unit (CPU) as a specific example of the processing unit 20 executes a program loaded into a memory as a specific example of the storage unit 30 to implement a function of the operation apparatus 1 according to the embodiment.

The input/output unit 10 includes a message reception unit 11 and a message transmission unit 12. Further, the processing unit 20 includes a received message processing unit 21, a rule execution unit 22, an action execution unit 23, and a transmission message processing unit 24. Further, the storage unit 30 includes a message storage unit 31, a firing rule storage unit 32, an action storage unit 33, and a common data storage unit 34.

The message reception unit 11 is an interface that receives a message input from an input apparatus 2. The input apparatus 2 is, for example, a management console that is operated by an administrator or an operation apparatus 1 itself (for example, receives messages that are exchanged between operational components included in the operation apparatus 1), but the input apparatus 2 is not limited thereto and may be, for example, a computer separate from the management console. Further, the message is an information medium for exchanging information between the operational components.

The message transmission unit 12 outputs a processing result of the processing unit 20. The processing result of the processing unit 20 is output as, for example, a file f, but is not limited thereto and may be a telegram. Further, the processing result of the processing unit 20 is, for example, a message created by the operational component included in the operation apparatus 1, that is, a message created by the transmission message processing unit 24, but is not limited thereto, and may be, for example, an output result of a functional unit (not shown) included in the processing unit 20.

The received message processing unit 21 stores the message received by the message reception unit 11 in the message storage unit 31.

The rule execution unit 22 refers to the message storage unit 31 and the firing rule storage unit 32 to execute an executable (firing) rule (a firing rule) for the message stored in the message storage unit 31 among the rules stored in the firing rule storage unit 32. The rule defines an autonomous operation of the operational components. The rule is prepared for each operational component.

Further, the rule execution unit 22 refers to the action storage unit 33 to select an action corresponding to the executed rule (an action required according to the rule). The action is indicative of the operation content of the operational component, and corresponds to each function when the operational process is classified in units of functions. The action is prepared for each operational component. Further, the rule execution unit 22 outputs an instruction to execute the selected action to the action execution unit 23.

The action execution unit 23 refers to the action stored in the action storage unit 33 to execute the action selected according to the rule execution unit 22. Further, the action execution unit 23 outputs an instruction to transmit a message according to a result of the execution of the action to the transmission message processing unit 24. Further, the action execution unit 23 stores the result of the execution of the action and state information indicating a state of each of the operational components associated with the action execution in the common data storage unit 34.

The transmission message processing unit 24 refers to the message storage unit 31 and the common data storage unit 34 to create a message based on the result of the action execution of the action execution unit 23, and outputs the message to the message transmission unit 12. The created message includes a message responding to the message stored in the message storage unit 31 (the message received by the message reception unit 11).

The process executed according to the rule execution unit 22, the action execution unit 23, and the transmission message processing unit 24 is repeated for each operational component. The message created by the transmission message processing unit 24 is a message created in each of the plurality of types of operational components, but a message created in a certain operational component is broadcast to the remaining operational components.

The message storage unit 31 stores the message received by the message reception unit 11 via the received message processing unit 21.

The firing rule storage unit 32 stores rules to be applied to the operational components.

The action storage unit 33 stores an action indicating the operation content of the operational component.

The common data storage unit 34 stores data available to each of the operational components as common data. The common data is, for example, state information indicating the result of the action execution of the action execution unit 23 and the state information indicating the state of each of the operational components associated with the action execution, but is not limited thereto.

Process

Next, a process executed by the operation apparatus 1 according to the embodiment will be described with reference to FIG. 2. A process shown in FIG. 2 starts according to the rule prepared for each of the operational components, that is, a rule stored in the firing rule storage unit 32, but starts, for example, after a predetermined time has elapsed or when a message has been received.

The operation apparatus 1 executes loop processing in steps S1$a$ to S1$b$ for each of the plurality of types of operational components. Hereinafter, a process for each of the operational components will be described.

The operation apparatus 1 then refers to the message storage unit 31 and the firing rule storage unit 32 to determine whether or not there is a firing rule using the rule execution unit 22 (step S2). When there is no firing rule (No in step S2), the operation apparatus 1 ends the process in FIG. 2 in the operational component that is a target, and starts the process in FIG. 2 for another operational component.

When there is a firing rule (Yes in step S2), the operation apparatus 1 refers to the action storage unit 33 to select an action corresponding to the firing rule using the rule execution unit 22 (step S3).

Next, the operation apparatus 1 executes the action selected according to the rule execution unit 22 using the action execution unit 23 (step S4).

The operation apparatus 1 refers to the message storage unit 31 and the common data storage unit 34 to create a message based on the result of the action execution using the transmission message processing unit 24, and outputs the message to the message transmission unit 12 (step S5).

Figure 2:
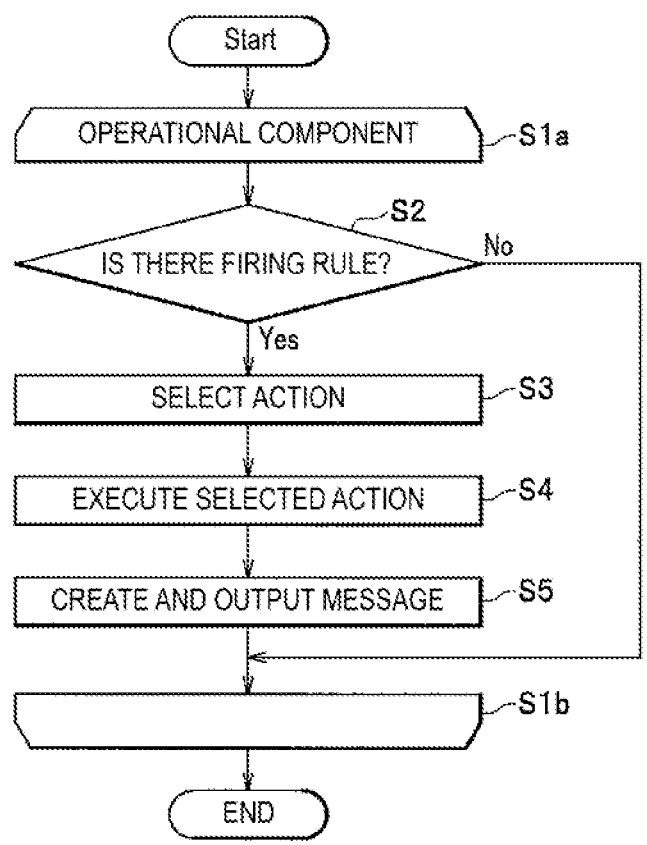
FIG. 2 is a flowchart of message processing that is executed by the operation apparatus according to the embodiment.

The process in FIG. 2 then ends in the operational component that is a target, and the process in FIG. 2 is repeated for all the operational components. The message transmission unit 12 broadcasts the message input from the transmission message processing unit 24 to the remaining operational components.

According to the embodiment, because the entire workflow can be established as a result of each of operational components obtained by converting the operational process into components operating autonomously, it is unnecessary for an entire large scale and complex workflow itself to be defined.

Thus, according to the present invention, it is possible to reduce development costs of operation automation.

Because the workflow component defined to represent each of the operational components is not very large in scale and is not very complex, high development costs are not required for operation automation.

Further, although a design of an entire workflow representing an operational process that is a target of operation automation is performed using a scheme of the related art, a design of workflow components representing the operational components of the embodiment can be also performed in the same manner as in the scheme of the related art. Therefore, description of a method of creating the operational component itself will be omitted.

SPECIFIC EXAMPLE

Next, an operation automation for implementing hull recovery in a network in which a service that is a maintenance target is provided will be described as a specific example of the embodiment.

Figure 3:
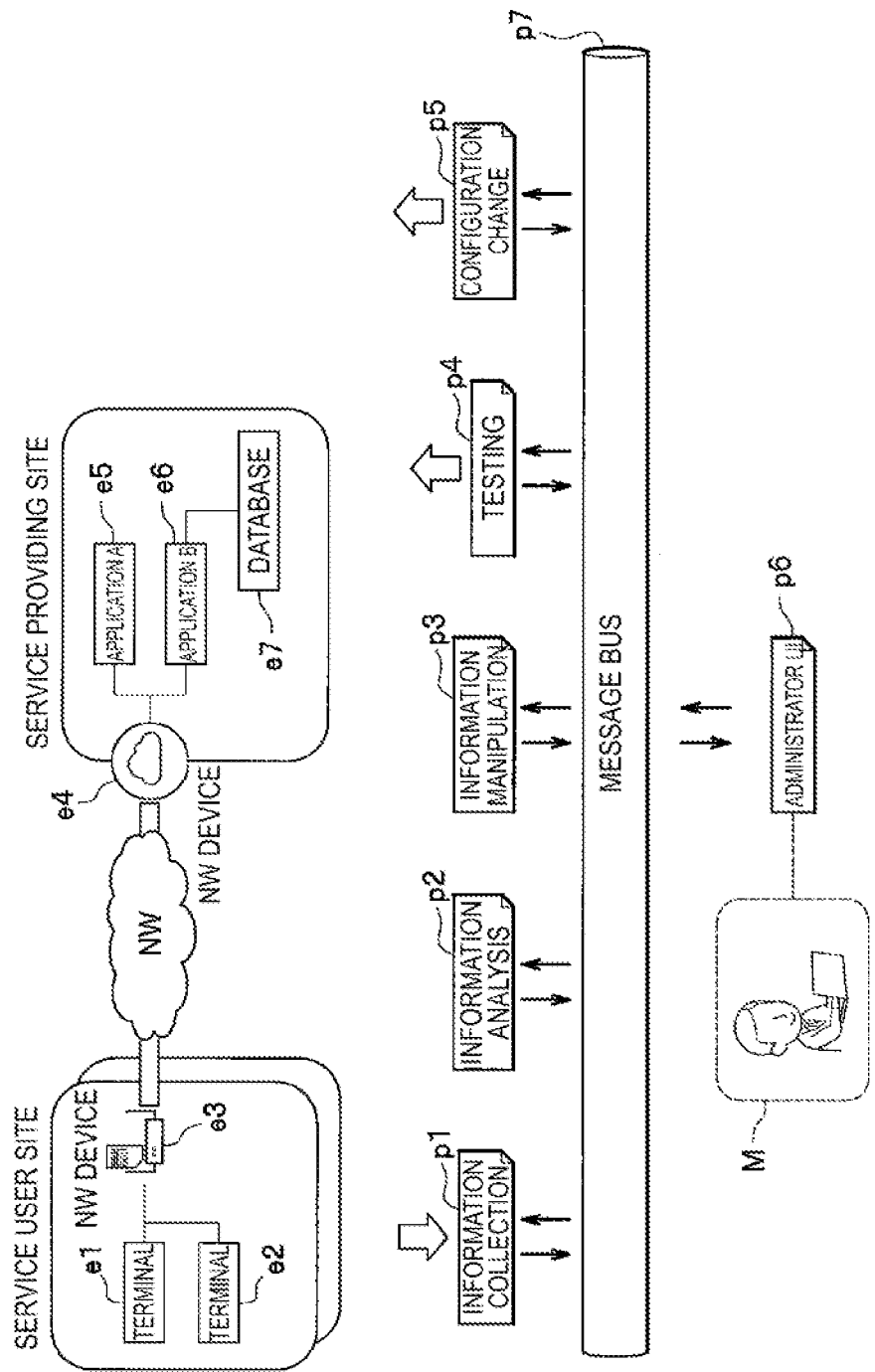
FIG. 3 is a diagram illustrating an example of an NW configuration that provides services in a specific example and an example of an architecture of a group of operational components.

A NW (network) configuration that provides the service of the specific example is as shown in an upper part of FIG. 3. The NW configuration of the specific example is a configuration in which a plurality of service user sites and service providing sites are connected via the NW. Services are provided to users of terminals e1 and e2 by exchanging information between NW device e4, an application A (e5), an application B (e6), and a database e7 disposed at the service providing sites and the terminals of and e2 and NW device e3 disposed at the service user sites.

In the present specific example, an operational process executed as an operation for fault recovery is classified into six operational components including information collection p1 (information collection component: collector), information analysis p2 (information analysis component: analyzer), information manipulation p3 (information manipulation component: editor), test p4 (test component: tester), configuration change p5 (configuration changing component: maintainer), and administrator UI (user interface) p6 (administrator), as shown in a lower part of FIG. 3. As illustrated in the lower part of FIG. 3, an architecture in which six operational components operating autonomously are loosely coupled is configured by providing an interface that enables the six operational components to exchange messages via a message bus p7.

The information collection p1 is a functional unit that collects information for service maintenance from an NW configuration (various types of network device (reference signs e1 to e7 in FIG. 3) responsible for the NW configuration). The information collection p1 can execute reversible information processing, such as timestamp impartment and difference value calculation.

The information analysis p2 is a functional unit that analyzes the information collected by the information collection p1 or performs a calculation process on existing information (including the information collected by the information collection p1) to generate new information. Examples of the calculation process include, but are not limited to, classification (for example, abnormality determination and clustering) and prediction, and may include, for example, state estimation.

The information manipulation p3 is a functional unit that manipulates the information collected by the information collection p1 or executes irreversible information processing for existing information (including the information collected by the information collection p1). Examples of the irreversible information processing include, but are not limited to, noise cancellation, correlation relationship calculation, feature extraction, and keyword extraction, and may include, for example, statistical processing. Further, the information manipulation p3 can execute a process of visualizing processing results of the irreversible information processing (for example, graph display and screen display).

The test p4 is a fictional unit that performs a test for fault confirmation in the network. Examples of the test include, but are not limited to, ping, curl, traceroute, and 1 call. The test p4 may issue a test call for a test.

The configuration change p5 is a functional unit that issues a change operation for the NW configuration and changes the NW configuration. Examples of the changing operation include, but are not limited to, user-containing change, resource addition, and service recreation.

An administrator UI (p6) is a functional unit that provides a UI through which a management console M operated by an administrator performs exchange of messages with the other operational components (p1 to p5) via the message bus p7. The administrator UI (p6) can transmit a message with which the administrator permits an operation of each of the operational components (p1 to p5) to each of the operational components (p1 to p5). The administrator UI (p6) can provide a unit that causes judgement of the administrator to intervene in an automated operation, and can assist in quality assurance of services.

Each of the operational components (p1 to p6) has the functions of the received message processing unit 21, the rule execution unit 22, the action execution unit 23, and the transmission message processing unit 24 described above.

For convenience of description, each of the operational components (p1 to p6) may be referred to as a "common" (all-parts) when applied to each of the operational components (p1 to p6).

Details of Message

The message exchanged by the respective operational components (p1 to p6) includes a plurality of types of sets of key, value, and metadata. An example of the set of key, value, and metadata handled in the specific example is shown in FIG. 4. As shown in FIG. 4, key includes, but is not limited to, src, dst, src_type, dst_type, id, relation_msg, msg_type, expect_state, current_state, and response_code. Further, content of the value and the metadata associated with each key are exemplified in FIG. 4. The metadata may not be present according to a type of key and is shown as a space in FIG. 4.

Src indicates a transmission source of the message, and an identifier of the operational component that is the transmission source is stored as an associated value.

dst indicates a transmission destination of the message, and an identifier of an operational component that is the transmission destination is stored as an associated value.

Src_type indicates a type of transmission source of the message, and a type of operational component that is the transmission source is stored as an associated value.

dst_type indicates a type of transmission destination of the message, and a type of operational component that is the transmission destination is stored as an associated value.

In this specific example, types of operational component included in the message are a collector, an analyzer, an editor, a tester, a maintainer, and an administrator.

id indicates a message that is a target, and an identifier of the message that is a target is stored as an associated value.

relation_msg indicates a message associated with the message that is a target (message identified by id), and an associated value indicates an identifier of the associated message. Examples of the associated message include, but are not limited to, parent_msg (parent message), sibling_msg (sibling relationship message) and child_msg (child message).

msg_type indicates a message type of the message that is a target, and the message type is stored as an associated value. Examples of the message type include, but are not limited to, a request, an info (notification), and a reply.

expect_state is a key held by a message of which the msg_type is request, and represents a result expected from the message being processed. A specific numerical value or a character string of an expected result is stored as an associated value, and the value conforms to a format shown in associated metadata. Supplemental information of descriptive content such as units or meanings of numerical values is stored in the associated metadata.

current_state is a key held by a message in which msg_type is info or reply, and indicates a processing result when the message has been processed. A specific numerical value or a character string of an expected result is stored as an associated value, and the value conforms to a format shown in associated metadata. Supplemental information of descriptive content such as units or meanings of numerical values is stored in the associated metadata.

Response_code is a key held by a message in which msg_type is reply, and indicates a relationship between messages such as receipt of asynchronous processing. A code number indicating a relationship between messages, a URI of a receipt destination, and the like are stored as an associated value.

Details of Firing Rule Storage Unit

The firing rile storage unit 32 in the specific example stores the rule prepared for each of the operational components (p1 to p6). An example of the rule stored in the firing rule storage unit 32 in the specific example is shown in FIG. 5. As shown in FIG. 5, each rule is represented by an association between an "item No." indicating an identification number of the rule, an "operational component" indicating a type of operational component operating according to the rule, "if" indicating a trigger of the operation according to the rule, and "then" indicating operation content of the operational component according to the rule.

A rule of No. 1 is a rule that is commonly used for the respective operational components (p1 to p6). According to the rule of No. 1, when each of the operational components (p1 to p6) receives a new message (for example, a message created by another operational component using the transmission message processing unit 24), each of the operational components (p1 to p6) stores the message in the message storage unit.

A rule of No. 2 is a rule that is used for the information collection p1. According to the rule of No. 2, the information collection p1 executes periodic collection when a predetermined period of time has elapsed from a previous collection. Further the information collection p1 transmits a collection completion message to the other operational components after a successful periodic collection.

A rule of No. 3 is a rule that is used for the information collection p1. According to the rule of No. 3, when the information collection p1 receives a request to collect information from the administrator and can process information requested, the information collection p1 replies to a transmission source (requester) with information indicating request receipt and a storage destination. Further, the information collection p1 collects the information requested for a requested period of time and stores the information in the common data storage unit 34. Further, the information collection p1 replies with relevant information (such as processing success or failure) to the transmission source after collection completion.

A rule of No. 4 is a rule that is used for the information analysis p2. According to the rule of No. 4, when the information analysis p2 receives the collection completion message from the information collection p1 or a manipulation completion message from the information manipulation p3 and is able to process information to be analyzed, the information analysis p2 acquires and analyzes information from the common data storage unit 34. Further, the information analysis p2 transmits an analysis completion message to the other operational components after analysis completion.

A rule of No. 5 is a rule that is used for the information analysis p2. According to the rule of No. 5, the information analysis p2 transmits an alarm message to the other operational components when a calculated value obtained as a result of the analysis of the information acquired from the common data storage unit 34 exceeds a threshold value.

A rule of No. 6 is a rule that is used for the information manipulation p3. According to the rule of No. 6, when the information manipulation p3 receives the collection completion message from the information collection p1 and is able to process information to be manipulated, the information manipulation p3 acquires information from the common data storage unit 34 and manipulates the information. Further, the information manipulation p3 newly stores information in the common data storage unit 34 after manipulation completion. Further, the information manipulation p3 transmits the manipulation completion message to the other operational components.

A rule of No. 7 is a rule that is used for the test p4. According to the rule of No. 7, when the test p4 receives an alarm message and a test condition regarding an alarm target is satisfied (for example, when a permission of test execution is obtained from the administrator), the test p4 executes a test that is an alarm target (such as a communication test and a life and death test). Further, the test p4 transmits a test result message to the other operational components after test completion.

A rule of No. 8 is a rule that is used for the test p4. According to the rule of No. 8, when the test p4 receives the alarm message and the test condition regarding the alarm target is not satisfied (for example, when the permission of the test execution is not obtained from the administrator), the test p4 transmits a message indicating requirements necessary for the test to the other operational components. Further, when the test condition is satisfied due to a subsequent reply, the test p4 updates its own state and stores the state in the common data storage unit 34.

A rule of No. 9 is a rule that is used for the test p4. According to the rule of No. 9, when the test result is NG, the test p4 transmits an alarm message with information on an NG location imparted thereto to the other operational components.

A rule of No. 10 is a rule that is used for configuration change p5. According to the rule of No. 10, when the configuration change p5 receives the alarm message and has a changing unit for the NG location, the configuration change p5 executes the changing unit.

A rule of No. 11 is a rule that is used for the configuration change p5. According to the rule of No. 11, when there is a ping response of network device, but there is no response from the application and the configuration change p5 includes a restarting unit for the application, the configuration change p5 executes restart of the application.

A rule of No. 12 is a rule that is used for the administrator UI (p6). According to the rule of No. 12, when the administrator UI (p6) receives a message, the administrator UI (p6) stores the received message as a log.

A rule of No. 13 is a rule that is used for the administrator UI (p6). According to rule of No. 13, when the administrator UI (p6) has acquired permission of a test execution of the test p4 from the administrator, the administrator UI (p6) transmits a test execution permission message to the other operational components.

Details of Action Storage Unit

The action storage unit 33 in the specific example stores the action (function) prepared for each of the operational components (p1 to p6). An example of the action stored in the action storage unit 33 in the specific example is shown in FIG. 6. Each action is represented by an association of "item No." indicating an identification number of the action, an "operational component" indicating a type of an operational component that executes the action, a "function" that serves as a name of the action, and an "argument necessary for execution" indicating arguments necessary for execution of the action, as shown in FIG. 6.

The action of No. 1 is a "message transmission" that is executed commonly by the respective operational components (p1 to p6). The "message transmission" has content of a message or the like as an argument and performs transmission of a message. The arguments necessary for execution of the "message transmission" are a type of message, content, an identifier of the operational component that is a transmission destination, and a type of operational component.

The action of No. 2 is a "message reception" that is executed commonly by the respective operational components (p1 to p6). The "message reception" acquires a message from the message bus p7 (FIG. 3) and stores the message in the message storage unit 31. An argument necessary for execution of the "message reception" is a message bus ID serving as an identifier of the message bus p7.

The action of No. 3 is a "server information collection" that is executed by the information collection p1. The "server information collection" executes information collection from server, device. Arguments necessary for execution of the "server information collection" are an IP address of server device that is a target and metrics to be collected (data obtained by quantifying collected information).

The action of No. 4 is an "NW information collection" that is executed by the information collection p1. The "NW information collection" performs information collection from the NW device. Arguments necessary for execution of the "NW information collection" are an IP address of network device that is a target, and metrics to be collected.

The action of No. 5 is "detection of outlier for time series data" that is executed by the information analysis p2. The "detection of outlier for the time series data" performs an outlier detection for a predetermined threshold value, and outputs a time at which an outlier has been detected. Arguments necessary for execution of the "detection of outlier for time series data" are time series data and a period of time to be analyzed.

The action of No. 6 is "Alarm message transmission" that is executed by the information analysis p2. The "Alarm message transmission" creates an alarm message and transmits the alarm message using "Message transmission". Arguments necessary for execution of the "alarm message transmission" are target metrics (for example, data obtained by quantifying the outlier attributable to the alarm) and an alarm target period of time (for example, a predetermined period of time including a time at which the outlier is detected).

The action of No. 7 is a "statistical processing (calculation of representative values)" that is executed by the information manipulation p3. The "Statistical processing (calculation of representative values)" calculates representative values of time series data, such as an average value, a median value, and variance. Arguments necessary for the execution of the "statistical processing (calculation of representative values)" are time series data and the representative values to be output.

The action of No. 8 is "visualization" that is executed by the information manipulation p3. The "visualization" creates a graph of the time series data and outputs a URL for referring to the graph. Arguments necessary for execution of "visualization" are the time series data and a target period of time.

The action of No. 9 is "L3 life and death monitoring for device" that is executed by the test p4. The "L3 life and death monitoring for device" performs L3 (Layer 3) life and death monitoring (for example, ping). An argument necessary for execution of "L3 life and death monitoring for device" is an IP address of target device.

The action of No. 10 is "L4 port monitoring" that is executed by the test p4. The "L4 port monitoring" performs L4 (Layer 4) port life and death monitoring (for example, curl). Arguments necessary for execution of "L4 port monitoring" are an IP address of the target device, a target port, and a protocol.

The action of No. 11 is a "VM specification change" that is executed by configuration change p5. The "VM specification change" performs a change in a specification of a virtual machine (VM) that is a part of the NW configuration. Arguments necessary for execution of the "VM specification change" are an identifier of a target VM and content after changing (for example, a target value of the specification). An existing changing unit can be used as a changing unit in the VM specification, and the configuration change p5 can appropriately select the changing unit, although description thereof is omitted.

The action of No. 12 is "application restart" that is executed by configuration change p5. The "application restart" performs restart of an application that is a part of the NW configuration. Arguments necessary for the execution of the "application restart" are an IP address of the target device, and a restart method.

Examples of Operation of Group of Operational Components in Specific Example

Figure 8:
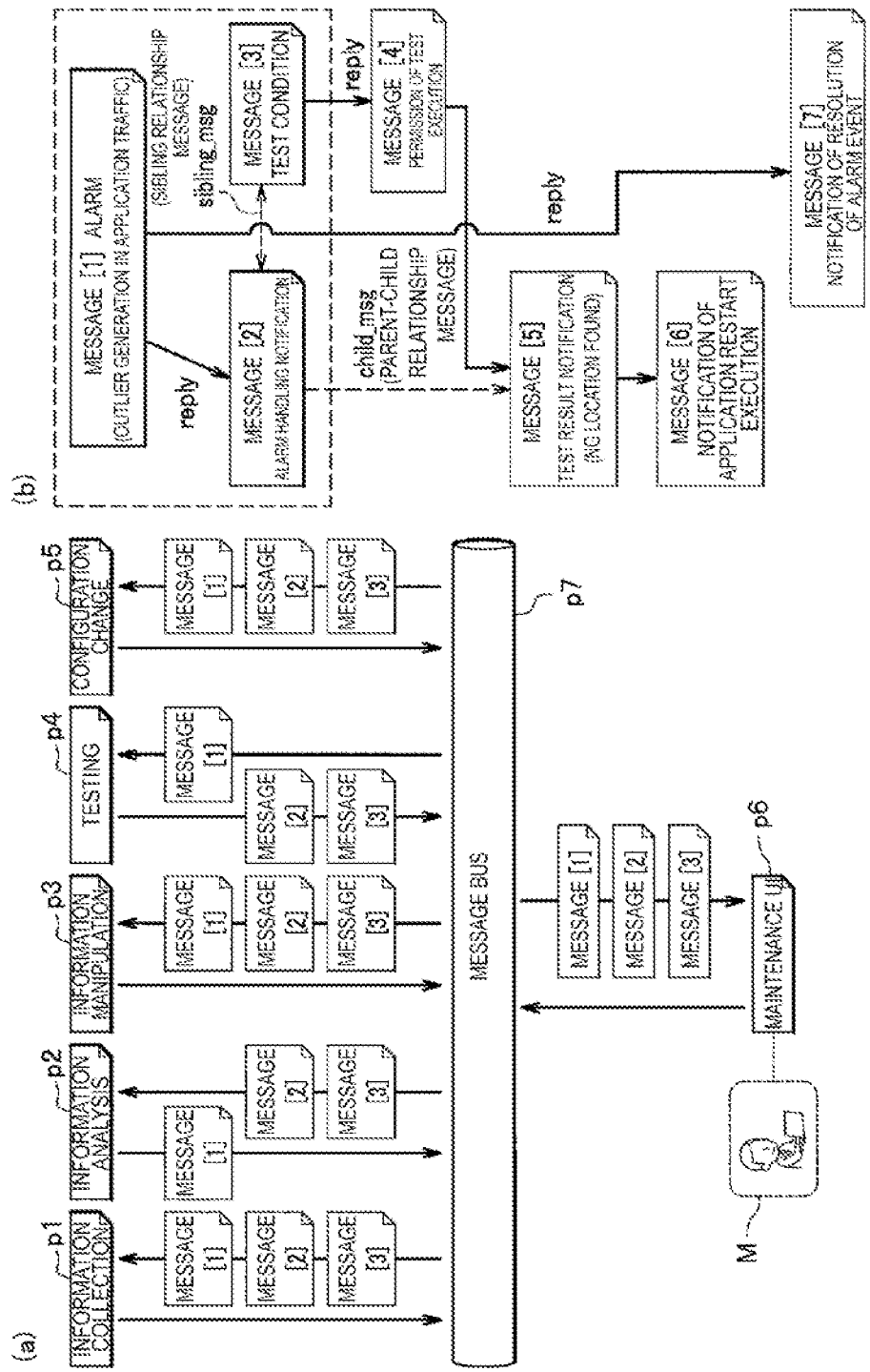
FIG. 8($a$) is an illustrative diagram of an example of an operation (part 1) of the group of operational components, and FIG. 8($b$) is an illustrative diagram of a relationship between messages in a group to be exchanged, both at the time of generation of an alarm in the specific example FIG. 9($a$) is an illustrative diagram of an example of an operation (part 2) of the group of operational components, and FIG. 9($b$) is an illustrative diagram of a relationship between messages in a group to be exchanged, both at the time of generation of the alarm in the specific example.
Figure 9:
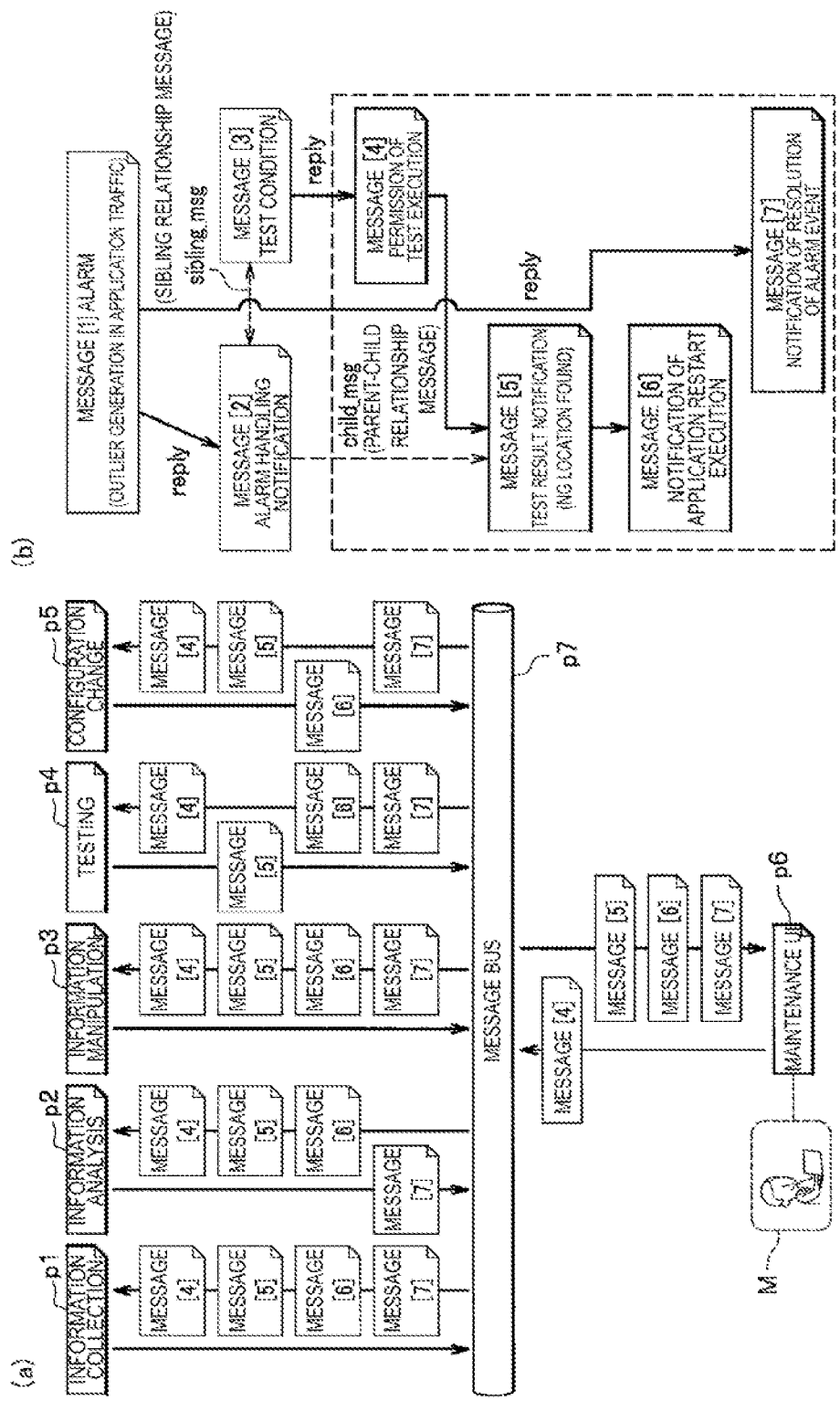

An example of an operation of the operational components (p1 to p6) in the specific example will be described with reference to FIGS. 7 to 9. This example of operation can be divided into a steady state (FIG. 7) in which no fault alarm is generated and the time of alarm generation (FIGS. 8 and 9) when a fault alarm is generated.

Steady State

First, an example of an operation in a steady state will be described.

In steady state, the following procedures x1 to x3 are executed on the basis of the actions stored in the action storage unit 33 (FIG. 6).

Procedure x1: Information collection p1 collects information from an NW configuration that is a target (FIG. 3).

Procedure x2: Information manipulation p3 periodically manipulates (visualizes) collection information.

Procedure x3: Information analysis p2 analyzes collection information (outlier detection)

When the procedure x1 is executed, the information collection p1 transmits the message [11] to the other operational components (p2 to p6) via the message bus p7, as shown in FIG. 7(a). The message [11] is a message indicating a completion notification of a periodic collection. The test p4 and the configuration change p5 discard the message [11] because the test p4 and the configuration change p5 do not have a rule that fires with the message [11] even when the test p4 and the configuration change p5 receive the message [11] (see FIG. 5). The administrator UI (p6) stores the received message [11] as a log (see FIG. 5).

"Because the test p4 and the configuration change p5 do not have a rule that fires with the message [11] (see FIG. 5)" means "because the test p4 and the configuration change p5 do not have the rules of Nos. 2 to 13 among the rules of Nos. 1 to 13 illustrated in FIG. 5", the rule of No. 1 is assumed not to be a target. That is, the rule of No. 1 in which a type of operational component is "common" is necessarily applied, and a new message received by each of the operational components (p1 to p6) is stored in the message storage unit 31 and is not discarded prior to the storage. The above meaning is also applied to other messages (messages [12], [13], and [1] to [7]) that will be described hereinafter in this example of operation.

Because the information manipulation p3 has a rule that fires with the message [11] (see FIG. 5), the information manipulation p3 starts visualization of the collection information (the procedure x2) using reception of the message [11] as a trigger. When the procedure x2 is executed, the information manipulation p3 transmits the message [12] to the other operational components (p1, p2, and p4 to p6) via the message bus p7. The message [12] is a message indicating a completion notification for visualization. The information collection p1, the information analysis p2, the test p4, and the configuration change p5 discard the message [12] because the information collection p1, the information analysis p2, the test p4, and the configuration change p5 do not have a rule that fires with the message [12] even when the information collection p1, the information analysis p2, the test p4, and the configuration change p5 receive the message [12] (see FIG. 5). The administrator UI (p6) stores the received message [12] as a log (see FIG. 5).

Because the information analysis p2 has a rule that fires with the message [11] (see FIG. 5), the information analysis p2 starts the outlier detection (the procedure x3) using reception of the message [11] as a trigger. When the procedure x3 is executed, the information analysis p2 transmits the message [13] to the other operational components (p1, and p3 to p6) via the message bus p7. The message [13] is a message indicating an analysis result (analysis completion). The information collection p1, the information manipulation p3, the test p4, and the configuration change p5 discard the message [13] because the information collection p1, the information manipulation p3, the test p4, and the configuration change p5 do not have a rule that fires with the message [13] even when the information collection p1, the information manipulation p3, the test p4, and the configuration change p5 receive the message [13] (see FIG. 5). The administrator UI (p6) stores the received message [13] as a log (see FIG. 5).

A relationship between the messages [11] to [13] is shown in FIG. 7(b). This relationship is determined on the basis of key, value, and metadata held in each of the messages [11] to [13] (see FIG. 4 and description with reference to FIG. 4).

The respective operational components (p1 to p6) are loosely coupled via the message bus p7 and can receive all the messages [11] to [13] generated in the steady state and autonomously execute the actions according to a firing rule, as described above. As a result, the respective operational components (p1 to p6) can cause an entire workflow of fault recovery in the steady state to be established, and can achieve operation automation.

Time of Generation of Alarm

Next, an example of an operation at the time of generation of the alarm will be described. The following procedures 1 to 6, for example, are executed on the basis of the actions stored in the action storage unit 33 at the time of generation of the alarm (FIG. 6).

Procedure 1: The information analysis p2 generates an alarm (detects an outlier In traffic (input traffic) of application A (e5) (FIG. 3)

Procedure 2: The test p4 starts (prepares) a test for the alarm and presents a test condition (a request for permission to test execution).

Procedure 3: The administrator UI (p6) replies with a permission of the test execution from the administrator.

Procedure 4: The test p4 executes a test of life and death monitoring. As a result of life and death monitoring, a dead service is found (ping comes back)

Procedure 5: The configuration change p5 executes restart of the application (application A (e5) (FIG. 3)).

Procedure 6: The in analysis p2 notifies of release of the alarm.

When the procedure 1 is executed, the information analysis p2 transmits the message [1] to the other operational components (p1 and p3 to p6) via the message bus p7, as shown in FIG. 8(a). The message [1] is an alarm message indicating that an outlier has been detected. The information collection p1, the information manipulation p3, and the configuration change p5 discard the message [1] because the information collection p1, the information manipulation p3, and the configuration change p5 do not have a rule that fires with the message [1] even when the information collection p1, the information manipulation p3, and the configuration change p5 receive the message [1] (see FIG. 5). The administrator UI (p6) stores the received message [1] as a log (see FIG. 5).

Because the test p4 has a rule that fires with the message [1] (see FIG. 5), a test is started (prepared) using the reception of the message [1] as a trigger (procedure 2). When the test has started, the test p4 transmits the message [2] to the other operational components (p1 to p3, p5, and p6) via the message bus p7. The message [2] is a notification message indicating that the test starts to handle the alarm. The information collection p1, the information analysis p2, the information manipulation p3, and the configuration change p5 discard the message [2] because the information collection p1, the information analysis p2, the information manipulation p3, and the configuration change p5 do not have a rule that fires with the message [2] even when the information collection p1, the information analysis p2, the information manipulation p3, and the configuration change p5 receive the message [2] (see FIG. 5). The administrator UI (p6) stores the received message [2] as a log (see FIG. 5).

Further, the test p4 presents test conditions (request for permission of test execution) in relation to the start of the test (procedure 2). When a test condition is presented, the test p4 transmits the message [3] to the other operational components (p1 to p3, p5, and p6) via the message bus p7. The message [3] is a message for requesting the administrator to permit the test execution as a test condition. The information collection p1, the information analysis p2, the information manipulation p3, and the configuration change p5 discard the message [3] because the information collection p1, the information analysis p2, the information manipulation p3, and the configuration change p5 do not have a rule that fires with the message [3] even when the information collection p1, the information analysis p2, the information manipulation p3, and the configuration change p5 receive the message [3] (see FIG. 5). The administrator UI (p6) stores the received message [3] as a log (see FIG. 5).

A relationship between the messages [1] to [3] and the following messages [4] to [7] is shown in FIG. 8(b). This relationship is determined on the basis of key, value, and metadata held in each of the messages [1] to [7] (see FIG. 4 and description with reference to FIG. 4). It is defined that the messages [2] and [3] are in a sibling relationship on the basis of key, value, and metadata included in the messages [2] and [3], and when the message [2] is transmitted, the message [3] is also transmitted.

When procedure 3 is executed after procedure 2, the administrator UI (p6) transmits the message [4] to the other operational components (p1 to p5) via the message bus p7, as shown in FIG. 9(a). The message [4] is a test execution permission message indicating that test execution is permitted. The information collection p1, the information analysis p2, the information manipulation p3, and the configuration change p5 discard the message [4] because the information collection p1, the information analysis p2, the information manipulation p3, and the configuration change p5 do not have a rule that fires with the message [4] even when the information collection p1, the information analysis p2, the information manipulation p3, and the configuration change p5 receive the message [4] (see FIG. 5).

Because the test p4 has a rule that fires with the message [4] (see FIG. 5), a test of life and death monitoring is executed using the reception of the message [4] as a trigger (procedure 4). When the test is executed, the test p4 transmits the message [5] to the other operational components (p1 to p3, p5, and p6) via the message bus p7. The message [5] is a notification message indicating a test result (found that the NG location is application A (e5) (FIG. 3)). The information collection p1, the information analysis p2, and the information manipulation p3 discard the message [5] because the information collection p1, the information analysis p2, and the information manipulation p3 do not have a rule that fires with the message [5] even when the information collection p1, the information analysis p2, and the information manipulation p3 receive the message [5] (see FIG. 5). The administrator UI (p6) stores the received message [5] as a log (see FIG. 5).

A relationship between the messages [1] to [7], which is the same as in FIG. 8(b), is shown in FIG. 9(b). It is defined that the messages [2] and [5] are in a parent-child relationship on the basis of key, value, and metadata included in messages [2] and [5], and the message [5] (child) is transmitted when predetermined conditions are satisfied after the message [2] (parent) has been transmitted.

Because the configuration change p5 has a rule that fires with the message [5] (see FIG. 5), restart of the application is executed using reception of the message [5] as a trigger (procedure 5). When procedure 5 is executed, the configuration change p5 transmits the message [6] to the other operational components (p1 to p4, and p6) via the message bus p7. The message [6] is a notification message indicating that the application has been executed. The information collection p1, the information analysis p2, the information manipulation p3, and the test p4 discard the message [6] because the information collection p1, the information analysis p2, the information manipulation p3, and the test p4 do not have a rule that fires with the message [6] even when the information collection p1, the information analysis p2, the information manipulation p3, and the test p4 receive the message [6] (see FIG. 5). The administrator UI (p6) stores the received message [6] as a log (see FIG. 5).

Figure 7:
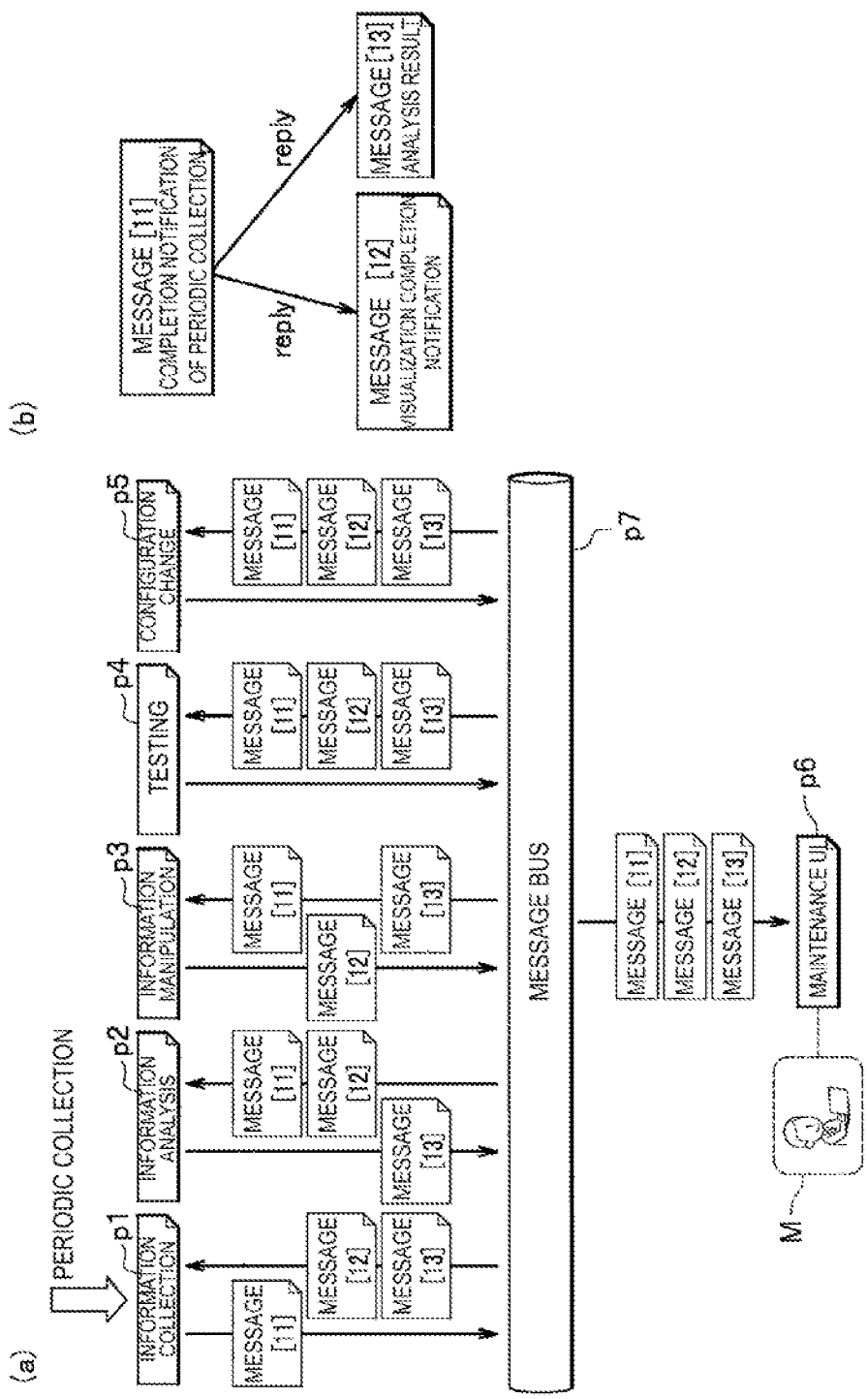
FIG. 7($a$) is an illustrative diagram of an operational example of a group of operational components, and FIG. 7($b$) is an illustrative diagram of a relationship between messages in a group to be exchanged, both in a steady state of the specific example.

Because the fault has been resolved by the configuration change p5 executing the restart of the application, tentative return to a state that is substantially the same as the steady state occurs (FIG. 7). Thus, the operation apparatus 1 executes the procedures x1 to x3 described above.

When the procedures x1 to x3 are executed and the information analysis p2 does not detect an outlier, the information analysis p2 transmits the message [7] to the other operational components (p1 and p3 to p6) via the message bus p7, as shown in FIG. 9(a). The message [7] is a message indicating an analysis result (analysis completion), and is a message for notifying alarm resolution. The information collection p1, the information manipulation p3, the test p4, and the configuration change p5 discard the message [7] because the information collection p1, the information manipulation p3, the test p4, and the configuration change p5 do not have a rule that fires with the message [7] even when the information collection p1, the information manipulation p3, the test p4, and the configuration change p5 receive the message [7] (see FIG. 5). The administrator UI (p6) stores the received message [7] as a log (see FIG. 5).

The respective operational components (p1 to p6) are loosely coupled via the message bus p7 and can receive all the messages [1] to [7] generated at the time of generation of the alarm and autonomously execute the actions according to a firing rule, as described above. As a result, the respective operational components (p1 to p6) can cause an entire workflow of fault recovery at the time of generation of the alarm to be established, and can achieve operation automation.

Others

In this specific example, a case in which a permission of the administrator is necessary when the test p4 executes a test has been described (the administrator UI (p6) transmits the message [4])). However, the test p4 may execute the test without a permission of the administrator. For example, when a test condition such as information acquisition being possible in parallel with the test or a degree of influence on a service associated with the test being below a predetermined threshold value is satisfied, the test p4 may be able to execute the test without a permission of the administrator.

Further, in the specific example, for example, a permission of the administrator may be required when the configuration change p5 changes the NW configuration, so that message exchange is performed.

Further, in a process that each of the operational components (p1 to p5) other than the administrator UI (p6) executes, a permission of the administrator via the administrator UI (p6) may be required or may not be required.

Further, in the embodiment, the operational process executed as the service maintenance operation is classified in units of functions and converted into components, but the present invention is not limited to the units of functions and the operational process may be classified in predetermined units such as units of sizes of workflow components.

A technique obtained by suitably combining various techniques described in the present embodiment may be implemented.

Software described in the present embodiment may be implemented as hardware, and hardware may be implemented as software.

In addition, hardware, software, the flowchart, and the like can be suitably changed without departing from the spirit of the present disclosure.

REFERENCE SIGNS LIST

1 Operation apparatus
10 Input/output unit
11 Message reception unit
12 Message transmission unit
20 Processing unit
21 Received message processing unit
22 Rule execution unit
23 Action execution unit
24 Transmission message processing unit
30 Storage unit
31 Message storage unit
32 Firing rule storage unit
33 Action storage unit
34 Common data storage unit

The invention claimed is:

1. An operation apparatus comprising one or more hardware processors for executing an operation regarding a service on a network, the operation apparatus comprising:
a message storage medium configured to store messages to be exchanged between a plurality of operational components, wherein the operation is converted into the plurality of operational components that are i) each autonomous, ii) coupled with each other via a predetermined interface, and iii) implemented by the one or more hardware processors of the operation apparatus;
a firing rule storage medium storing firing rules to be applied to each of the operational components, the firing rules define autonomous operations for each of the operational components under different trigger conditions;
an action storage medium storing actions indicating operation content of each of the operational components;
a rule execution unit, including one or more hardware processors, configured to determine, for each of the operational components, whether a trigger condition included in the firing rules is satisfied by referring to the message storage medium and the firing rule storage medium and, when a trigger condition included in a firing rule is satisfied, execute, for each of the operational components, a process of selecting an action corresponding to the firing rule from the action storage medium;
an action execution unit, including one or more hardware processors, configured to execute the selected action for each of the operational components; and
a transmission message processing unit, including one or more hardware processors, configured to execute, for each of the operational components, a process of creating a message and broadcasting the message to other operational components via the predetermined interface, on a basis of an execution result of the executed action,
wherein processes executed by the rule execution unit, the action execution unit, and the transmission message processing unit are repeated for each of the operational components.

2. The operation apparatus according to claim 1,
wherein the operation is an operation for implementing fault recovery in a network in which the service is provided, and
the operational components include:
an information collection component configured to collect information from a network configuration providing the service;
an information analysis component configured to analyze the collected information;
an information manipulation component configured to manipulate the collected information;
a test component configured to perform a test for fault confirmation in the network; and
a configuration changing component configured to change the network configuration.

3. The operation apparatus according to claim 1,
wherein the operational components includes an administrator user interface (UI) configured to transmit a message with which an administrator permits an operation of each of the operational components to each of the operational components.

4. An operation method at an operation apparatus comprising one or more hardware processors for executing an operation regarding a service on a network,
wherein the operation apparatus includes:
a message storage medium configured to store messages to be exchanged between a plurality of operational components, wherein the operation is converted into the plurality of operational components that are i) each autonomous, ii) coupled with each other via a predetermined interface, and iii) implemented by the one or more hardware processors of the operation apparatus;
a firing rule storage medium storing firing rules to be applied to each of the operational components, the firing rules define autonomous operations for each of the operational components under different trigger conditions; and
an action storage medium storing actions indicating operation content of each of the operational components, and
the method includes, at the operation apparatus, repeatedly executing the following processes for each of the operational components:
determining, for each of the operational components, whether a trigger condition included in the firing rules is satisfied by referring to the message storage medium and the firing rule storage medium and when a trigger condition included in a firing rule is satisfied, executing, for each of the operational components, a process of selecting an action corresponding to the firing rule from the action storage medium;
executing the selected action for each of the operational components; and
executing, for each of the operational components, a process of creating a message and broadcasting the message to other operational components via the predetermined interface, on a basis of an execution result of the executed action.

5. The operation method according to claim 4,
wherein the operation is an operation for implementing fault recovery in a network in which the service is provided, and the operational components include:

an information collection component configured to collect information from a network configuration providing the service;

an information analysis component configured to analyze the collected information;

an information manipulation component configured to manipulate the collected information;

a test component configured to perform a test for fault confirmation in the network; and a configuration changing component configured to change the network configuration.

6. The operation method according to claim 4, wherein the operational components includes an administrator UI configured to transmit a message with which an administrator permits an operation of each of the operational components to each of the operational components.

* * * * *